United States Patent
Dutschke

(10) Patent No.: US 7,461,737 B2
(45) Date of Patent: Dec. 9, 2008

(54) SAFETY GUARD FOR AUGER INTAKE

(75) Inventor: Reginald Vernon Dutschke, Brinkworth (AU)

(73) Assignee: Auger Safe Holdings Pty Ltd., South Australia (AU)

( * ) Notice: Subject to any disclaimer, the term of this patent is extended or adjusted under 35 U.S.C. 154(b) by 469 days.

(21) Appl. No.: 10/555,947

(22) PCT Filed: May 7, 2004

(86) PCT No.: PCT/AU2004/000589

§ 371 (c)(1),
(2), (4) Date: Nov. 7, 2005

(87) PCT Pub. No.: WO2004/099044

PCT Pub. Date: Nov. 18, 2004

(65) Prior Publication Data

US 2006/0157323 A1    Jul. 20, 2006

(30) Foreign Application Priority Data

May 9, 2003   (AU) ............................ 2003902218

(51) Int. Cl.
*B65G 33/26*   (2006.01)

(52) U.S. Cl. ...................................... 198/659; 198/670
(58) Field of Classification Search .......... 198/657–677
See application file for complete search history.

(56) References Cited

U.S. PATENT DOCUMENTS

| 3,635,329 | A | * | 1/1972 | Walters | 198/672 |
| 4,352,426 | A | | 10/1982 | Peterson, Jr. | |
| 4,572,356 | A | * | 2/1986 | Janick | 198/667 |
| 6,533,105 | B1 | | 3/2003 | Dutschke | |

* cited by examiner

*Primary Examiner*—Jacob Y. Choi
*Assistant Examiner*—William R Harp
(74) *Attorney, Agent, or Firm*—Klauber & Jackson, LLC

(57) ABSTRACT

Replaceable intake section (14) of grain auger (10) includes fixed metal elongate support (22) secured to tubular casing (11) and extending beneath flexible intake end flight portion (17) which is connected by a clutch to the main flight of auger (10). Pliable, soft, rubber, safety guard or collar (27) is part-circular in section and extends around flight portion (17). Longitudinal edges on guard (27) normally engage with edges (34) of support (22). If an obstruction, such as an operator's foot, engages the auger intake, free end portions of guard (27) can disengage from edges (34) of elongate support (22) to minimise jamming or injury. Collar (27) may be attached to adjustable slide (25) to vary the length of flighting (17) exposed and thereby alter the rate of feed.

19 Claims, 5 Drawing Sheets

US 7,461,737 B2

SAFETY GUARD FOR AUGER INTAKE

CROSS REFERENCE TO RELATED APPLICATIONS

The present application is a National Stage Application claiming the priority of co-pending PCT Application No. PCT/AU2004/000589 filed May. 7,2004, which in turn, claims priority from Australian Application No. 2003902218, filed May. 9, 2003. Applicants claim the benefits of 35 U.S.C. §120 as to the PCT application and priority under 35 U.S.C. §119 as to the said Australian application, and the entire disclosures of both applications are incorporated herein by reference in their entireties.

FIELD OF THE INVENTION

This invention relates to new and useful improvements to augers, in particular an auger used for conveying grain and other particulate material. In one particular form the invention relates to an improved guard arrangement fitted to a material conveying auger at its intake or feed end and which is designed to reduce the risk of serious injury or damage to a person working in the near vicinity thereof.

BACKGROUND OF THE INVENTION

In my earlier filed Australian Patent No. 756760 entitled "Improvements in and relating to grain augers and the like", there is disclosed a safety guard device for fitment at the intake end of the auger in the form of a soft pliable tubular extension sleeve arranged to encircle at least a portion of the intake flighting, the sleeve being attachable to the lower or intake end of the auger casing which surrounds the main drive shaft and its helical flighting. Although this arrangement is still considered quite satisfactory further developments have been made in order to simplify the construction of the safety guard in order to make it more economical to manufacture and more suited to the purpose for which it is designed.

It is an object of the present invention to provide an improved form of a safety guard arrangement for a material conveying auger which is simple in construction, economical in manufacture, can be readily fitted to an existing auger, and which, even further reduces the risk of serious injury or damage by engagement of a person's limb or a foreign object with the exposed intake portion of the auger intake flight.

Another object of the present invention is to provide an improved safety guard arrangement for an auger at its intake end and which is designed so that the extent of exposed portion of the intake flighting can be conveniently varied by an operator to in turn control the rate of intake of grain (or any other material) at the intake end.

It is a still further object of the present invention to provide an improved safety clutch mechanism for the intake end of an auger assembly which is housed wholly within the tubular shaft of an auger intake section and which enables the intake flighting, in the event of it being damaged to be readily replaced without disturbing the clutch mechanism.

SUMMARY OF THE INVENTION

In one aspect the present invention accordingly provides a safety guard arrangement for an auger of the type including an elongate tubular casing, an auger flight on a main auger shaft jouralled for rotation in said tubular casing, said flight having an intake end flight portion, characterised by:

fixed elongate support means secured to said tubular casing at one end thereof and arranged to extend longitudinally therefrom beneath said intake end flight portion of said auger flight, said support means including longitudinally extending engagement surfaces on opposed sides of said intake end flight portion, and a pliable part circular protective collar secured to said elongate tubular casing and which extends circumferentially around said intake end flight portion, said part circular collar forming a co-axial extension of said elongate tubular casing at said one end thereof, wherein said collar has transversely spaced apart axially extending edges which engage and are supported by said longitudinally extending engagement surfaces.

It will be appreciated that the use of the pliable collar partly surrounding the intake flighting largely eliminates potential pinch points and thus greatly minimises the likelihood of a serious injury being suffered should a limb of an operator become caught in the intake end of the auger.

It is also an advantage of the present invention that in the event of an obstruction engaging within the intake end auger portion, portions of the free ends of the safety collar are able to detach from their respective engagement surfaces with the result that the opening around the intake flighting is increased and there is less chance of jamming occurring. Furthermore with one or both of the collar ends disengaged, it is easier for the obstruction to be pulled out rather than being caught by the intake flighting and drawn in thereby. In a situation where the obstruction is a hand or foot of an operator, it is essential that it can be withdrawn from the flighting without serious injury or damage.

Preferably, the casing includes a part circular slide slidably and co-axially mounted on said one end of said elongate tubular casing with said part circular pliable collar being secured to the outer end of said part circular slide, said slide being slidable co-axially with respect to the casing with said axially extending edges on the collar being supported by said engagement surfaces for slidable movement therealong, whereby the extent of exposed intake helical flighting on the intake end flight portion can be selectively varied.

By having the safety collar attached to a slide on the casing, it is possible to minimise amount of exposed intake flighting when the auger is not in use. This is also advantageous at start up of the auger, particularly when certain types of material are being conveyed and there is a danger of overloading the auger at start up. After start up, the rate of flow of material can be varied by retracting the slide and thereby exposing more intake flighting.

Preferably, each of the axially extending edges on the part circular collar includes a rebate portion which defines an outwardly opening recess which abuts a respective engagement surface.

Optionally, each of the edges on the part circular collar includes spaced apart approximately parallel inner and outer lips which define a groove or slot for receiving and locating over a respective said engagement surface.

Preferably, the part circular collar is formed from a soft pliable plastics or rubber material.

Preferably, the auger flight includes a main flight section and an intake flight section separate from said main flight section, said intake flight section including a central tubular support sleeve and intake helical flighting secured to said tubular sleeve, an intake end auger shaft portion extending from and rotatable with the main auger shaft, said tubular support sleeve being rotatably mounted co-axially on said intake end auger shaft portion, and drive coupling means operably coupling the intake flighting tubular support sleeve and said intake end auger shaft portion, arranged so that when said intake helical flighting is subject to an overload condition, said drive coupling means automatically disengages drive to the tubular support sleeve.

Clearly, this improves safety and reduces injury in the event of an hand or foot of an operator being accidentally caught in the intake end of the auger as the intake helical flighting will cease being driven when the drive coupling means automatically disengages drive to the tubular support sleeve.

Preferably, the intake helical flighting is formed of resilient flexible wear resistant material.

Preferably, the intake helical flighting is substantially similar in diameter and configuration to the flighting on said main flight section and is aligned therewith.

Preferably, the auger shaft is supported at the intake end of the auger for rotation in a bearing support arrangement which is mounted at the outer end of said elongate support means.

Preferably, the bearing support arrangement includes a ring-like mounting bracket fixedly secured to the outer end of said support means, and an integrally formed bearing support member detachably fitted to said bracket centrally thereof, said bearing support member including an apertured portion for rotatably receiving an end of said auger shaft and a plurality of radially extending arms or legs which are spaced around the periphery of said apertured portion, each said arm or leg having its outer free end removably located in an opening in the wall of said ring-like bracket, said legs being resiliently deformable.

With this arrangement, in the event of a bearing support needing replacement, this can be done quite readily by deforming the radial legs so as to disengage their outer ends from their apertures in the mounting bracket, removing the bearing support member and thereafter refitting a new bearing support member.

Preferably, the support means includes a unitary metal plate which has an arcuate portion at its inner end and a pair of transversely spaced apart V-section bars extending longitudinally from said arcuate portion at its outer end, each said bar being to said mounting bracket said arcuate portion being releasably clamped to said main auger casing by means of a plurality of ring clamps.

BRIEF DESCRIPTION OF THE DRAWINGS

With the foregoing in view, and other advantages as will become apparent to those skilled in the art to which this invention relates, a preferred embodiment of the invention is hereinafter described with reference to and as illustrated in the accompanying drawings wherein.

In the following description, like reference characters designate like or corresponding parts through out the several views of the drawings.

DESCRIPTION OF PREFERRED EMBODIMENT

Figure 1:
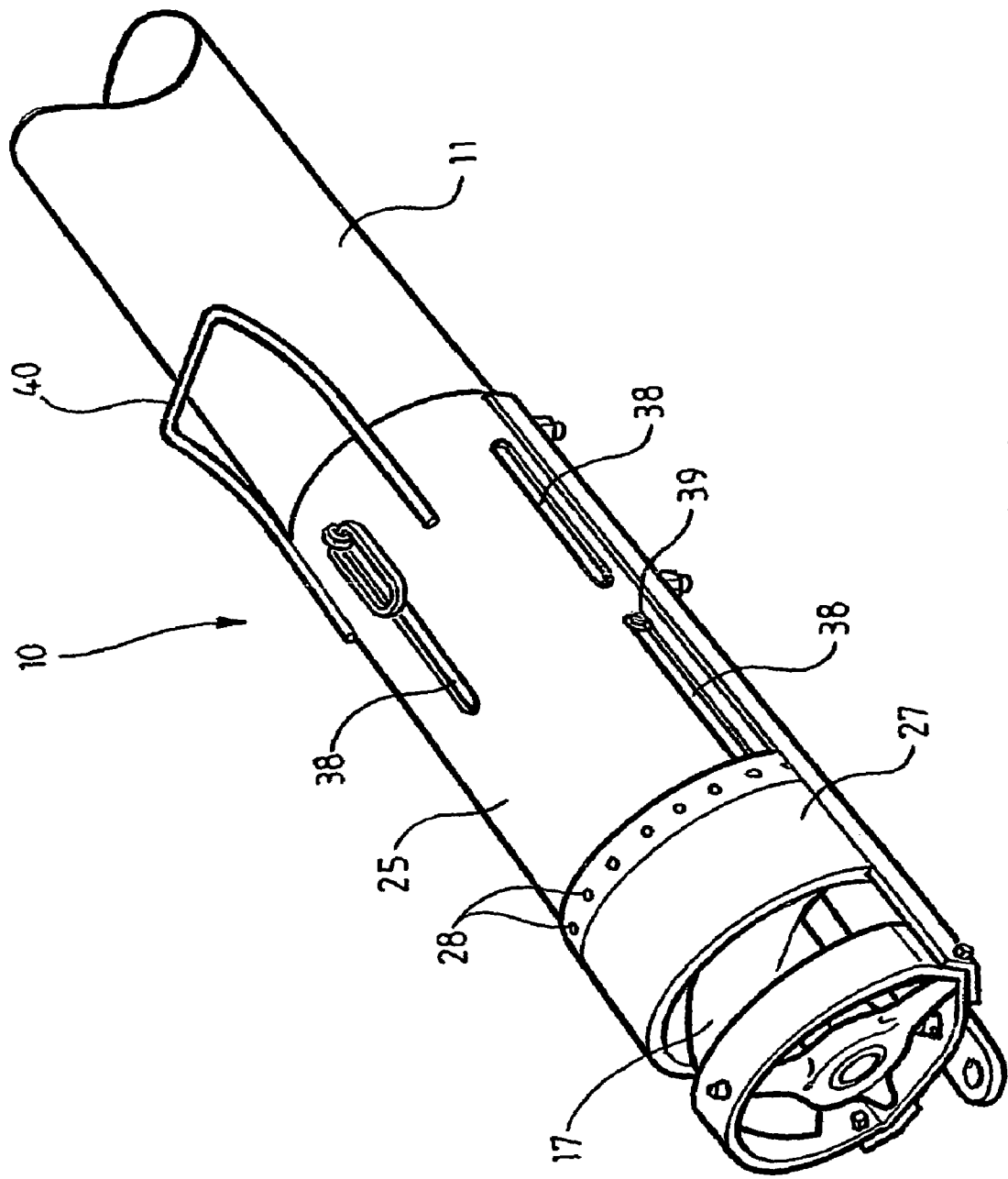
FIG. 1 is a fragmentary perspective view of a safety guard arrangement fitted to the intake end of a conventional auger, according to a preferred embodiment of the invention.
Figure 2:
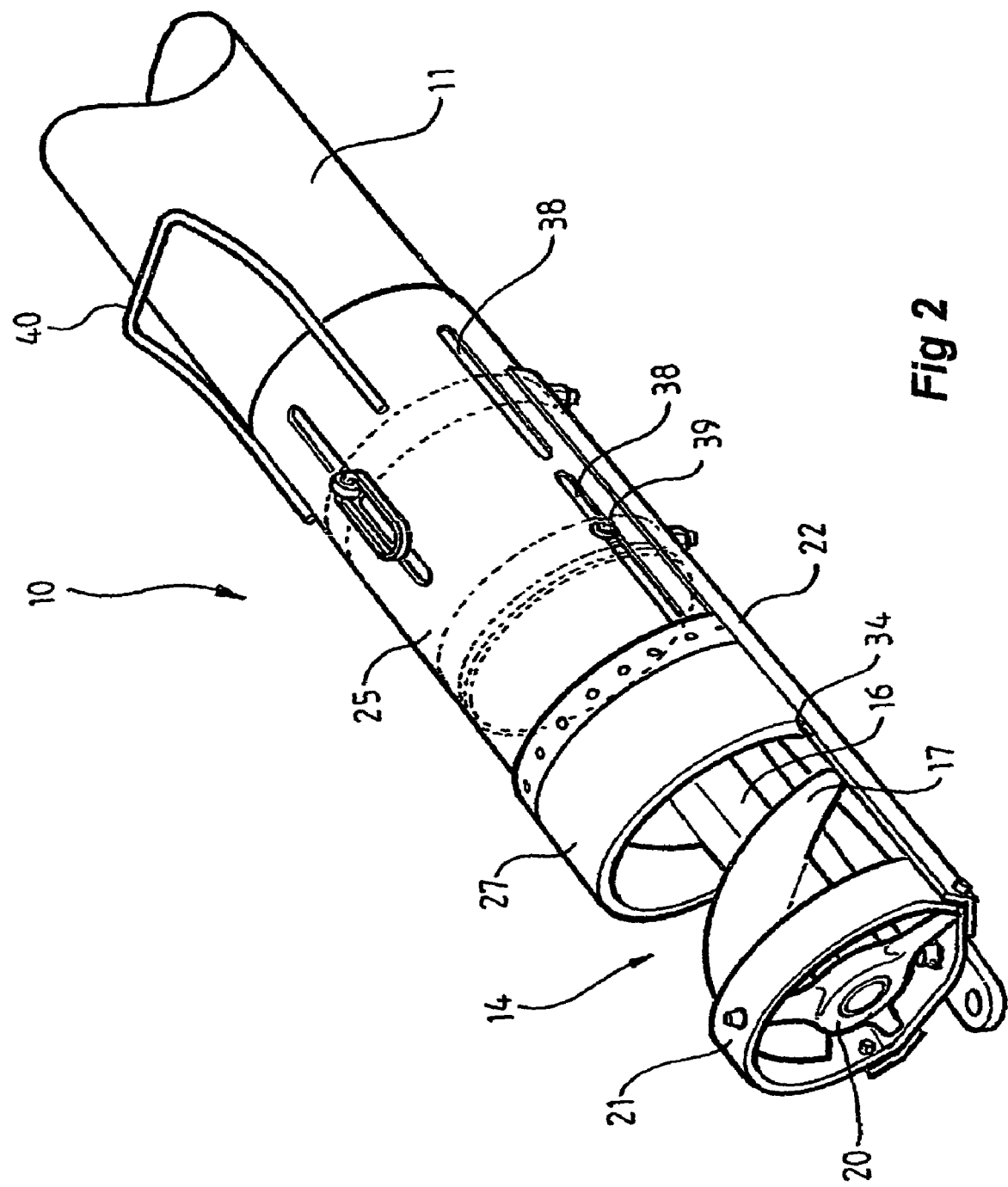
FIG. 2 is a view similar to FIG. 1 showing the adjustable slide in a retracted position.
Figure 3:
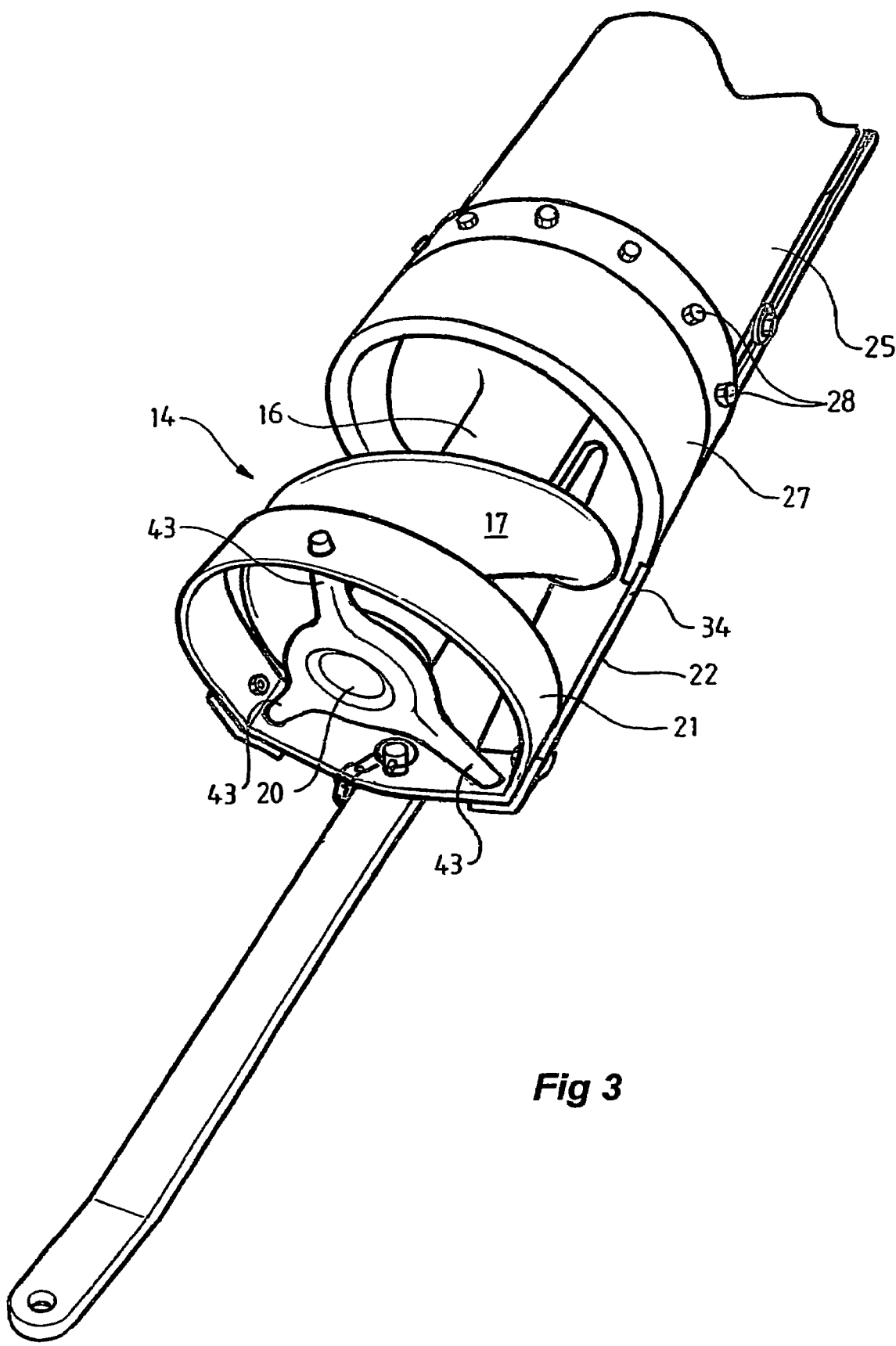
FIG. 3 is a fragmentary perspective view similar to FIG. 2 and which shows a draw bar attachment pivotally connected to the underside of the auger and which can attach to a towing vehicle for transporting the auger.

Referring to the accompanying drawings, there is shown an auger assembly 10 which includes an elongated tubular auger casing 11 having a main drive shaft 12 journalled for rotation therein and around which is provided a main auger flight 13 having an intake end flight portion, this arrangement all being of conventional design. In this embodiment, a portion of the auger has been cut-off from its intake end so as to permit the fitment of a replacement intake section 14.

The replacement auger intake section 14 includes an intake flighting section 15 which comprises a central tubular support sleeve 16 and flexible helical flighting 17 secured thereto and being similar in diameter and configuration to the flighting 13 of main auger flight section. The tubular support sleeve 16 has an inner square section metal tube through which extends an intake end auger shaft portion 19' which, in this embodiment, is directly coupled to the main drive shaft 12 so as to rotate therewith and forms a co-axial extension thereof. The coupling of the intake end shaft portion 19 and the main drive shaft 12 can be effected in a number of different ways which will be well known to those skilled in the art.

The outer end of the intake shaft 19 is supported for rotation in a bearing support member 20 which itself is removably fitted to a circular bracket 21 which is fixed to the outer end of an elongate metal plate support 22 which in turn is secured at its inner end to the lower or bottom end of the main casing 11 and projects longitudinally therefrom. In this embodiment the metal support 22 is secured to the casing 11 by means of ring clamps 23 which engage around the outside of the casing 11 at spaced apart locations therealong. This is clearly shown in FIG. 4 of the drawings.

In this embodiment, the metal outer casing 11 is provided with an adjustable slide 25 slidably mounted at the lower end thereof for axial movement with respect thereto between a fully extended position wherein a relatively small amount of intake helical flighting 17 is exposed (refer FIG. 1) and a fully retracted position wherein substantially the whole of the intake helical flighting 15 is exposed. In this way the rate of flow of material being transported by the auger can be regulated by adjusting the position of the slide 25 so as to decrease or increase the volume of material being fed into the intake end.

Figure 4:
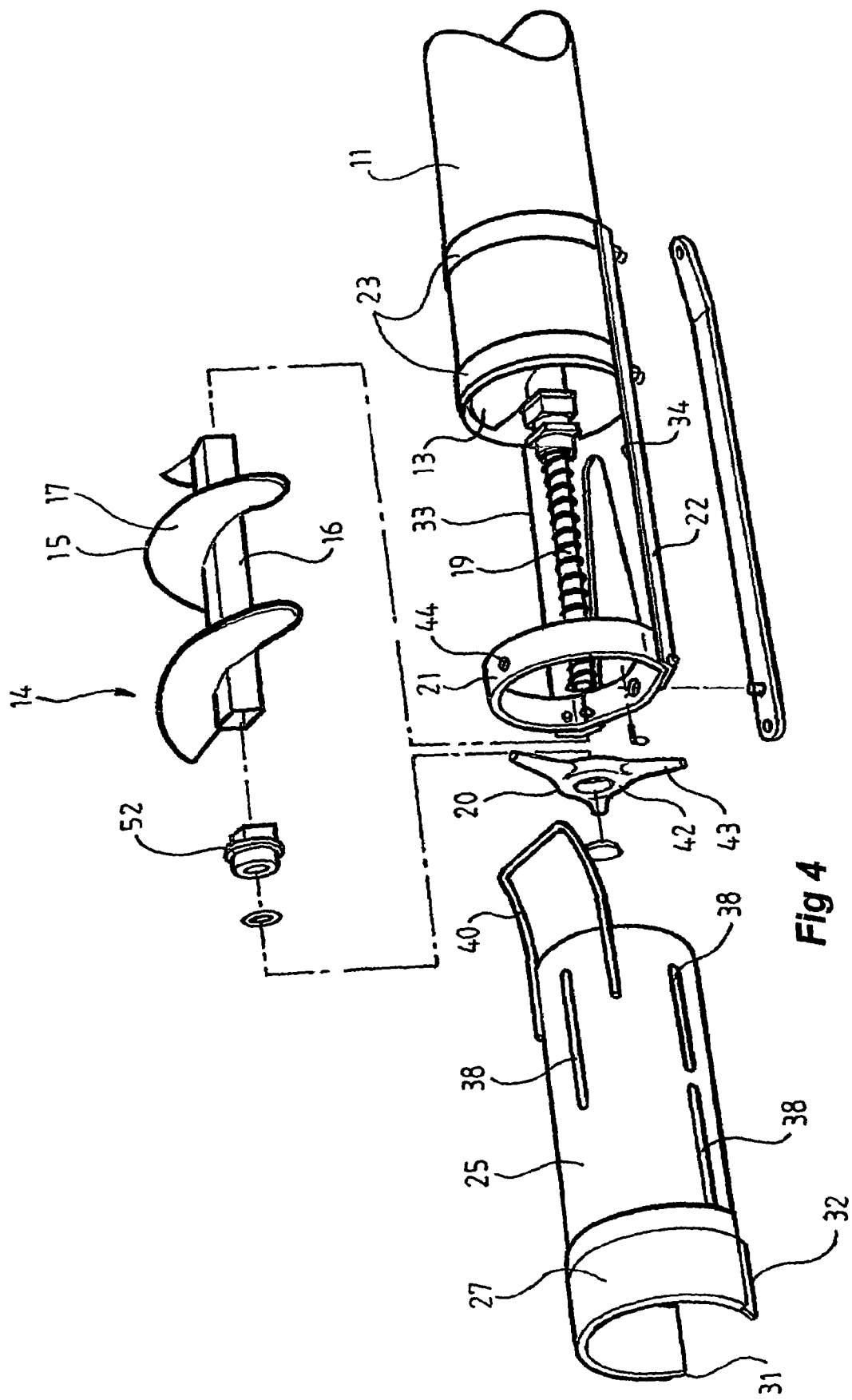
FIG. 4 is an exploded perspective view of the assembly shown in FIG. 1.

Attached to the outer end of the slide 25 is a protective substantially part circular safety collar or skirt 27 formed of soft pliable rubber or rubber-like material, the inner side of the collar 27 being fastened, eg. by means of fasteners 28, to the outer periphery of the slide 25. The collar 27 has a part circular shape (when fitted) and defines a co-axial extension of the slide 25. In this embodiment the collar or skirt 27 is formed from a flat blank of soft pliable rubber or rubber-like material—the stiffness of which can vary depending on the type of material being transported by the auger. As shown in FIG. 4, the axially extending edges 31, 32 of the part circular collar or skirt 27 are rebated on the outside face of the collar. The rebated ends 31, 32 resiliently engage against respective longitudinal edge portions 33, 34 of the elongate metal support 22. This ensures that the collar or skirt 27 is retained in a part circular shape around the intake helical flighting 17 in close proximity thereto. The abutting engagement of the rebated ends 31, 32 with edge portions 33, 34 on the support 22 allows the collar 27 to slide along the elongate support 22 when the axial position of the slide 25 is adjusted.

In this embodiment the slide 25 is also part circular and is guided for axial sliding movement with respect to the casing 11 by means of elongate slots 38 formed in the wall of the metal slide 25 and guide pins or studs 39 fixed to and projecting from the outer surface of the main casing 11. Desirably the slide 25 is also provided with a handle 40 which can be grasped by an operator in order to effect axial adjustment of the slide 25.

It should be appreciated however that the protective collar or skirt 27 can be attached to the lower end of the main casing 11 in a situation where the slide 25 is not utilised. In this instance, the amount of exposed intake helical flighting 17 would not be able to be varied unless collars of different widths are used.

In this embodiment, the bearing support member 20 is moulded of plastics material and comprises a central bearing housing portion 42 and a plurality of radially outwardly directed legs 43, each of which has its free end held captively engaged in an aperture 44 formed in the wall of the ring bracket 21. The legs 43 are resiliently deformable and are designed, under force, to bend so that they can be detatched from the ring bracket 21. This construction has two significant advantages. Firstly, in the event of a bearing support member 20 being damaged or worn, it can be readily replaced. Secondly, the deformability of the bearing support member 20 also assists in minimising the likelihood of an obstruction, eg. a boot or foot of an operator, being jammed in the intake flighting in a situation where such obstruction protrudes into and/or through the ring bracket. The bearing support is designed so that it will deform appreciably to allow the obstruction to be withdrawn or dislodge itself from its mounting bracket.

Figure 5:
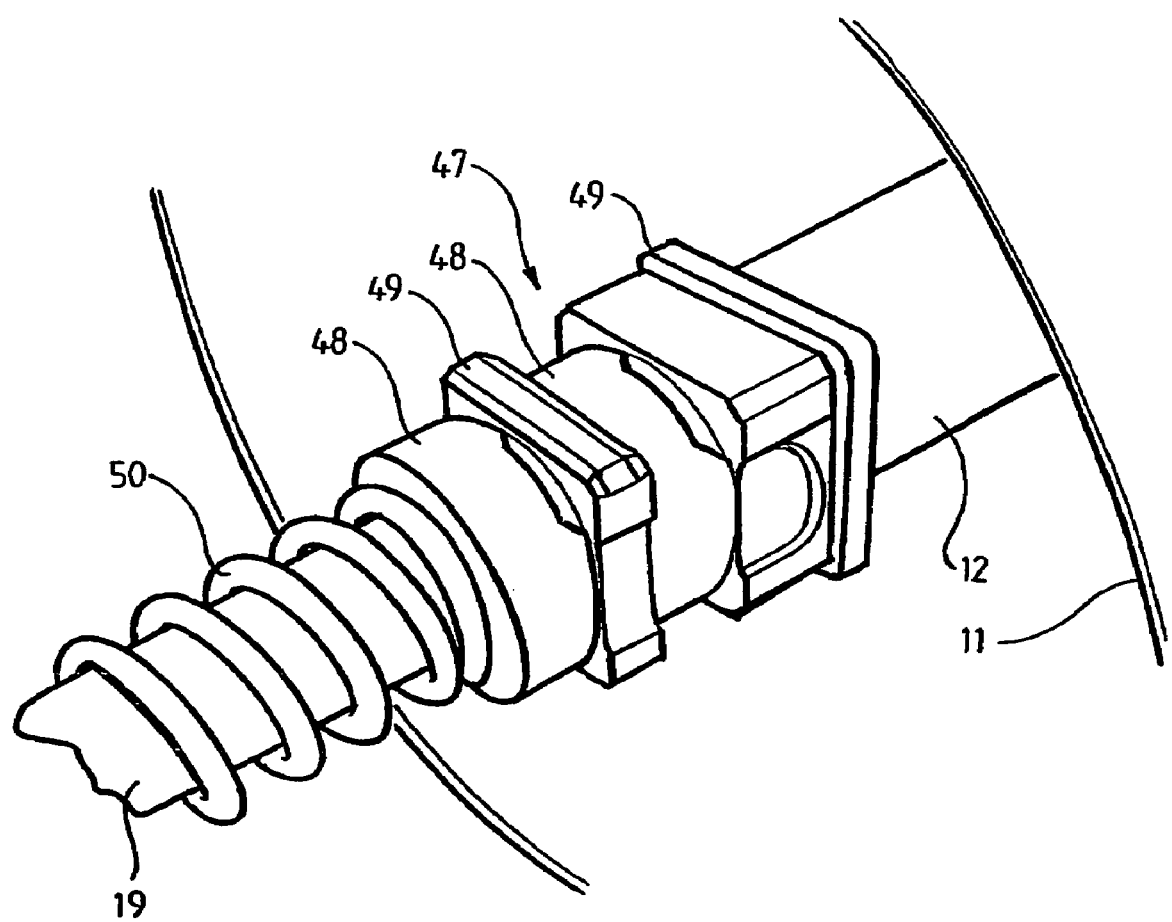
FIG. 5 is a fragmentary perspective view of the clutch device mounted on the intake end auger shaft portion (with the intake flighting removed therefrom).

Referring now to FIG. 5 of the drawings, a clutch device 47 is provided at the inner end of the intake end shaft portion 19 to drivingly couple the intake flighting tubular support sleeve 16 to the intake end auger shaft portion 19 and in turn the main drive shaft 12. In this embodiment the clutch device 47 is a multi-stage assembly consisting of a plurality of driver and driven clutch plate elements 48, 49 respectively. The driven plate elements 49 are shaped correspondingly to the square section of the tubular sleeve 16 of the intake flight section 15 and hence rotate with the intake helical flighting 17.

In the event of an overload situation, the driver and driven clutch elements will disengage and thereby disengage drive to the intake flight section 15 which can then freely rotate about the intake end shaft portion 19. A heavy compression spring 50 is designed to urge the clutch elements 48, 49 into keying engagement with one another, with the spring 50 abutting against the outer one of the driver elements 48 at one end thereof, and at its other end against an end face of the bearing 52 which is mounted at the outer end of the intake end shaft portion 19. It is advantageous that the clutch device 47 is completely housed interiorly of the intake flighting tubular support sleeve 16 and can therefore be sealed off. Furthermore, in the event of the intake flight section 15 having to be replaced, this can be done without disturbing the clutch device. The tubular sleeve 16, when the bearing support is dismantled, can simply slide off the shaft 19 and a replacement intake flight section 15 fitted.

A brief consideration of the above described embodiment will indicate that the invention provides an extremely simple, economical safety feature for a material conveying auger which is effective to significantly reduce the risk of serious injury or damage by engagement of a person or object with the exposed portion of the intake auger flight.

Although a preferred embodiment the present invention has been described in the foregoing detailed description, it will be understood that the invention is not limited to the embodiment disclosed, but is capable of numerous rearrangements, modifications and substitutions without departing from the scope of the invention as set forth and defined by the following claims.

The invention claimed is:

1. A safety guard arrangement for an auger of the type including an elongate tubular casing, an auger flight on a main auger shaft journalled for rotation in said tubular casing, said flight having an intake end flight portion, characterised by:
   a fixed elongate support secured to said tubular casing at one end thereof and arranged to extend longitudinally therefrom beneath said intake end flight portion of said auger flight, said support including longitudinally extending engagement surfaces on opposed sides of said intake end flight portion, and
   a pliable substantially partially circular protective collar secured to said elongate tubular casing and which extends circumferentially around said intake end flight portion, said partially circular collar forming a co-axial extension of said elongate tubular casing at said one end thereof, wherein said collar has transversely spaced apart axially extending edges which engage and are supported by said longitudinally extending engagement surfaces.

2. A safety guard arrangement as claimed in claim 1, wherein said casing includes a partially circular slide slidably and co-axially mounted on said one end of said elongate tubular casing with said partially circular pliable collar being secured to the outer end of said partially circular slide, said slide being slidable co-axially with respect to the casing with said axially extending edges on the collar being supported by said engagement surfaces for slidable movement therealong, whereby the extent of exposed intake helical fighting on the intake end flight portion can be selectively varied.

3. A safety guard arrangement as claimed in claim 1, wherein each of the axially extending edges on the partially circular collar includes a rebate portion which defines an outwardly opening recess which abuts a respective engagement surface.

4. A safety guard arrangement as claimed in claim 1, wherein each of the edges on the partially circular collar includes spaced apart approximately parallel inner and outer lips which define a groove or slot for receiving and locating over a respective said engagement surface.

5. A safety guard arrangement as claimed in claim 1, wherein the partially circular collar is formed from a soft pliable plastics or rubber material.

6. A safety guard arrangement as claimed in claim 1, wherein said auger flight includes a main flight section and an intake flight section separate from said main flight section, said intake flight section including a central tubular support sleeve and intake helical fighting secured to said tubular sleeve, an intake end auger shaft portion extending from and rotatable with the main auger shaft, said tubular support sleeve being rotatably mounted co-axially on said intake end auger shaft portion and a drive coupling operably coupling the intake fighting tubular support sleeve and said intake end auger shaft portion, arranged so that when said intake helical fighting is subject to an overload condition, said drive coupling automatically disengages drive to the tubular support sleeve.

7. A safety guard arrangement as claimed in claim 6, wherein said intake helical fighting is formed of resilient flexible wear resistant material.

8. A safety guard arrangement as claimed in claim 6, wherein said intake helical fighting is substantially similar in diameter and configuration to the fighting on said main flight section and is aligned therewith.

9. A safety guard arrangement as claimed in claim 1, wherein the auger shaft is supported at the intake end of the auger for rotation in a bearing support arrangement which is mounted at the outer end of said elongate support.

10. A safety guard arrangement as claimed in claim 9, wherein said bearing support arrangement includes a ring-like mounting bracket fixedly secured to the outer end of said support, and an integrally formed bearing support member detachably fitted to said bracket centrally thereof, said bearing support member including an apertured portion for rotatably receiving an end of said auger shaft and a plurality of radially extending arms or legs which are spaced around the periphery of said apertured portion, each said arm or leg having its outer free end removably located in an opening in the wall of said ring-like bracket, said legs being resiliently deformable.

11. A safety guard arrangement as claimed in claim 10, wherein said support includes a unitary metal plate which has an arcuate portion at its inner end and a pair of transversely spaced apart V-section bars extending longitudinally from said arcuate portion at its outer end each, said bar being secured to said mounting bracket said arcuate portion being releasably clamped to said main auger casing by a plurality of ring clamps.

12. A safety guard arrangement as claimed in claim 2, wherein each of the axially extending edges on the partially circular collar includes a rebate portion which defines an outwardly opening recess which abuts a respective engagement surface.

13. A safety guard arrangement as claimed in claim 2, wherein each of the edges on the partially circular collar includes spaced apart approximately parallel inner and outer lips which define a groove or slot for receiving and locating over a respective said engagement surface.

14. A safety guard arrangement as claimed in claim 2, wherein the partially circular collar is formed from a soft pliable plastics or rubber material.

15. A safety guard arrangement as claimed in claim 2, wherein said auger flight includes a main flight section and an intake flight section separate from said main flight section, said intake flight section including a central tubular support sleeve and intake helical fighting secured to said tubular sleeve, an intake end auger shaft portion extending from and rotatable with the main auger shaft, said tubular support sleeve being rotatably mounted co-axially on said intake end auger shaft portion and a drive coupling operably coupling the intake fighting tubular support sleeve and said intake end auger shaft portion, arranged so that when said intake helical fighting is subject to an overload condition, said drive coupling automatically disengages drive to the tubular support sleeve.

16. A safety guard arrangement as claimed in claim 15, wherein said intake helical fighting is formed of resilient flexible wear resistant material.

17. A safety guard arrangement as claimed in claim 7, wherein said intake helical fighting is substantially similar in diameter and configuration to the fighting on said main flight section and is aligned therewith.

18. A safety guard arrangement as claimed in claim 15, wherein said intake helical fighting is substantially similar in diameter and configuration to the fighting on said main flight section and is aligned therewith.

19. A safety guard arrangement as claimed in claim 16, wherein said intake helical fighting is substantially similar in diameter and configuration to the fighting on said main flight section and is aligned therewith.

* * * * *